Figure 1:
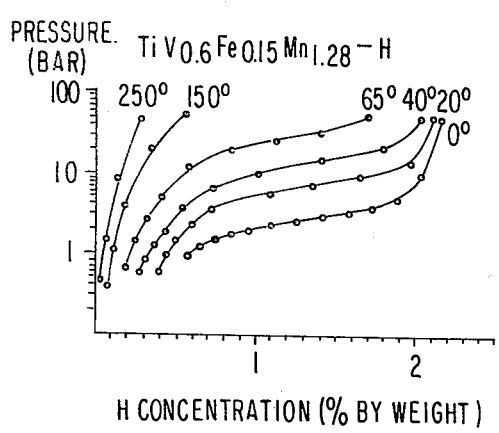

United States Patent [19]

Bernauer et al.

[11] Patent Number: 4,457,891
[45] Date of Patent: Jul. 3, 1984

[54] HYDROGEN STORAGE ALLOY

[75] Inventors: Otto Bernauer, Weinstadt; Klaus Ziegler, Ostfildern; both of Fed. Rep. of Germany

[73] Assignee: Daimler-Benz Aktiengesellschaft, Fed. Rep. of Germany

[21] Appl. No.: 475,367

[22] Filed: Mar. 14, 1983

[30] Foreign Application Priority Data

Mar. 20, 1982 [DE] Fed. Rep. of Germany ....... 3210381

[51] Int. Cl.$^3$ .......................... C22C 30/00; C01B 6/02
[52] U.S. Cl. .................................. 420/434; 420/580; 420/581; 420/583; 420/582; 423/644
[58] Field of Search ............... 420/900, 417, 418, 420, 420/421, 424, 434, 581, 588, 587, 582, 583, 584, 420/580; 423/644, 648 R

[56] References Cited

U.S. PATENT DOCUMENTS

| | | | |
|---|---|---|---|
| 4,079,523 | 3/1978 | Sandrock | 34/15 |
| 4,111,689 | 9/1978 | Liu | 420/900 |
| 4,152,145 | 5/1979 | Sandrock | 420/900 |
| 4,160,014 | 7/1979 | Gamo et al. | 423/644 |
| 4,195,989 | 4/1980 | Gamo et al. | 420/900 |
| 4,358,316 | 11/1982 | Liu et al. | 75/123 N |
| 4,370,163 | 1/1983 | Moriwaki et al. | 420/582 |

Primary Examiner—L. Dewayne Rutledge
Assistant Examiner—Christopher W. Brody
Attorney, Agent, or Firm—Craig & Burns

[57] ABSTRACT

A hydrogen storage material is described which comprises an alloy of the composition of 25 to 30.9% by weight of Ti, about 10 to about 42% by weight of V and about 27.1 to about 65.1% by weight of Mn. The proviso is that more than 2 up to at most 2.2 atoms are present per titanium atom. Up to about 40%, preferably about 10 to about 40%, of the vanadium atoms can be replaced by iron atoms and up to about 10%, preferably about 3 to about 10%, can be replaced by aluminum atoms, but not more than about 40% of the vanadium atoms in total are replaced. Moreover, in place of titanium, a mixture can be used in which up to about 20% of the titanium fraction are replaced by Ca, Y, La, misch metal, or mixtures thereof. Up to about 0.2 atom of Cr per the titanium atom, up to about 0.1 atom of Ni per titanium atom and up to about 0.05 atom of Cu per titanium atom can also be present, but not more than about 0.1 atom of Ni plus Cu, these atoms replacing the same number of vanadium atoms.

9 Claims, 4 Drawing Figures

HYDROGEN STORAGE ALLOY

TECHNICAL FIELD

This invention relates to the storage of hydrogen in metals and metal alloys. Typical examples of metallic materials which reversibly store hydrogen in the form of hydride, are alloys of Mg, Mg/Ni, Mg/Cu, Ti/Fe, Ca/Ni, R/Ni or R/Co (R designating a rare earth element).

BACKGROUND ART

High storage capacities of up to 7% by weight of hydrogen, relative to the mass of the alloy, are obtained with magnesium and magnesium/nickel alloys. To expel the hydrogen, however, temperatures of more than 250° C. are required, with a large supply of energy at the same time. The high temperature level and the high energy requirement for expelling the hydrogen have the effect that, for example, a motor vehicle with an internal combustion engine, cannot exclusively be operated from these stores. This occurs because the energy contained in the exhaust gas, in the most favorable case (full load), is sufficient for meeting 50% of the hydrogen requirement of the internal combustion engine from a magnesium or magnesium/nickel store. Thus, the remaining hydrogen demand must be taken from a hydride store. For example, this store can be titanium/iron hydride (a typical low-temperature hydride store) which can be operated at temperatures down to below 0° C. These low-temperature hydride stores have the disadvantage of only having a low hydrogen storage capacity.

Storage materials have been developed in the past, which have a relatively high storage capacity but from which hydrogen is nevertheless expelled at temperatures of up to about 250° C. U.S. Pat. No. 4,160,014 describes a hydrogen storage material of the formula $Ti_{1-x}Zr_xMn_{2-y-z}Cr_yV_z$, wherein x=0.05 to 0.4, y=0 to 1 and z=0 to 0.4. Up to about 2% by weight of hydrogen can be stored in such an alloy. In addition to this relatively low storage capacity, these alloys also have the disadvantage that the price of the alloy is very high when metallic vanadium is used.

Moreover, U.S. Pat. No. 4,111,689 has disclosed a storage alloy which comprises 31 to 46% by weight of titanium, 5 to 33% by weight of vanadium and 36 to 53% by weight of iron and/or manganese. Although alloys of this type have a greater storage capacity for hydrogen than the alloy according to U.S. Pat. No. 4,160,014, hereby incorporated by reference, they have the disadvantage that temperatures of at least 250° C. are necessary in order to completely expel the hydrogen. At temperatures of up to about 100° C., about 80% of the hydrogen content can be discharged in the best case. However, a high discharge capacity, particularly at low temperatures, is frequently necessary in industry because the heat required for liberating the hydrogen from the hydride stores is often available only at a low temperature level.

It is, therefore, the object of the present invention to disclose a hydrogen storage material which has a large storage capacity for hydrogen and from which at least 90% of the hydrogen content is liberated under a pressure of one bar at a temperature of up to 100° C.

These and other objects, features and advantages of the present invention will become more apparent from the following description which shows, for purposes of illustration only, embodiments of the present invention.

DISCLOSURE OF THE INVENTION

The hydrogen storage material according to the invention comprises an alloy of the composition of 25 to 30.9% by weight of titanium, about 10 to about 42% by weight of vanadium and about 27.1 to about 65.1% by weight of manganese. The ratio of titanium atoms to vanadium and manganese atoms must be selected in such a way that more than 2 but at most 2.2 additional atoms are present per titanium atom. If less than about 2 additional atoms per titanium atom are present, the percentage of hydrogen which can be discharged, at temperatures of up to 100° C., significantly decreases. If more than about 2.2 additional atoms per titanium atom are present, it is no longer possible to obtain a homogenous alloy structure and the $H_2$ capacity decreases as a result. In addition, it has been found that up to about 40% of the vanadium atoms can be replaced by iron atoms and up to about 10% of the vanadium atoms can be replaced by aluminum atoms. With a simultaneous replacement of vanadium atoms by iron atoms and aluminum atoms, however, not more than about 40% of the vanadium atoms in total should be replaced. Preferably, about 10 to about 40%, and more preferably, about 10 to about 20%, of the vanadium atoms are replaced by iron atoms or about 3 to about 5% of the vanadium atoms are replaced by aluminum atoms or, with simultaneous replacement of vanadium atoms by aluminum and iron atoms, about 10 to about 20% of the vanadium atoms are replaced, but only about 3 to about 5% of these are replaced by aluminum.

When vanadium is used exclusively, the high vanadium fraction of the alloy has the disadvantage of poor availability and high price. The possibility of replacing a part of the vanadium by iron or aluminum results not only in a reduction of the vanadium fraction but, moreover, also enables the vanadium/iron or vanadium/aluminum master alloys, for example of composition $V_4Fe$ or $V_3Al$, which are cheaply available in large quantities, to be employed. This results in a considerable reduction in the cost of the storage material. Unexpectedly, the replacement of vanadium atoms by iron or aluminum atoms leads only to a quite insignificant decrease in the storage capacity of the alloy.

Furthermore, it has been found that manganese and/or vanadium atoms can also be replaced by chromium atoms, but not more than about 0.2 atom of chromium per titanium atom may be present in the alloy. If this ratio is exceeded, this increased amount has an influence on the structure of the alloy, and the hydrogen dischargeable at relatively low temperatures decreases. Additionally, manganese and/or vanadium atoms can also be replaced to a limited extent by nickel or copper atoms. However, the alloy may not contain more than about 0.1 atom of nickel per titanium atom or about 0.05 atom of copper per titanium atom. If copper and nickel are present together, the alloy may not contain more than about 0.1 atom of nickel and copper in total per titanium atom. Otherwise, the electronic structure of the alloy with respect to absorption of $H_2$ deteriorates.

Sometimes it is desirable to impart very definite physical properties to the hydrogen storage material, for example, with respect to the pressure at a given temperature or the enthalpy of formation. For this purpose, it is possible to replace a part of the titanium by calcium, yttrium, lanthanum, misch metal or other rare earth metals, but not more than about 20% of the titanium can be replaced by these elements. Because these elements act at the same time as a deoxidizing agent in the melt of the alloy, the proportion lost as the deoxidizing agent must be taken into account in the feed quantity.

To obtain an initial resistance of the hydrogen storage material towards foreign gases, it is possible to enrich the alloys, the surface and the grain boundaries of the alloy on the above-mentioned basis with elements such as sulphur, phosphorus or carbon. This enrichment has the effect that hydrogen can penetrate through the surface into the metal lattice, while foreign gases, such as CO, $CO_2$, $N_2$, $O_2$ and $H_2O$ can be held back at the surface.

An enrichment with the said elements on the surface or grain boundary can be achieved by known plating processes. Exemplary processes are simultaneous mechanical grinding, vapor-deposition, sputtering or by simultaneous introduction of the elements concerned into the melt, because these elements segregate in the direction of the surface and the grain boundaries during cooling from the melt temperature to the ambient temperature.

The metal texture of the storage material according to the invention is a mixed crystal with the Laves phase structures C14 or C15. To prepare the storage material, the conventional metallurgical synthesis processes, such as smelting of the alloy in an electric arc (compare U.S. Pat. No. 4,160,014, column 4) and induction smelting as well as the known sintering processes can be used.

The hydrogen can be completely expelled from all these storage materials at temperatures of up to 250° C., and the predominant part can be expelled up to about 60° C. The material according to the invention has an excellent isothermal discharge capacity (discharge of $H_2$ at constant hydride temperature), so that the new storage material is particularly suitable for use in motor vehicles which are equipped with an internal combustion engine consuming hydrogen. The material according to the present invention is suitable for use in hydride heat pumps and hydride heat converters. Moreover, the initial activation does not require any special processes. The materials are hydrogen-active even at room temperature.

EXAMPLES

Various alloys were prepared by smelting the elements or master alloys together, in an electric arc. The alloys were powdered and charged with hydrogen under a pressure of 50 bars between 0° C. and 35° C. The storage capacity (% by weight of $H_2$ relative to the storage material) was established and the temperature behavior was determined. The results are summarized in the table. To clarify the temperature behavior, the temperature behavior of the alloys of Examples 1 and 2 as well as Examples 4 and 5 are shown graphically in FIGS. 1 to 4, for comparison. In Example 1 (FIG. 2) according to the invention, 90% of the hydrogen content can be discharged with a hydrogen pressure of 1 bar at temperatures of up to 100° C. In Example 2 (FIG. 1) according to the invention, 90% of the hydrogen content can be discharged at temperatures up to 80° C. The isothermal discharge capacity (discharge of $H_2$ at constant temperature) is up to 80%. If, however, the titanium content is increased, this positive hydrogenation behavior is lost above about 30.9% by weight of titanium. Even at a titanium content of 31% by weight (Example 4 for comparison; FIG. 3), only about 70% of the stored hydrogen can still be discharged up to 100° C., as also shown for comparison by Example 5, FIG. 4, with a Ti content of 31.13%. In this case also, only about 70% of the $H_2$ content can still be discharged up to 100° C.; the isothermal discharge capacity falls to about 40%.

TABLE

Figure 2:
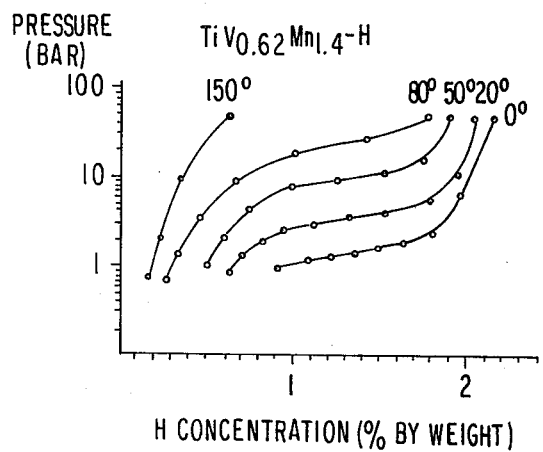
Figure 3:
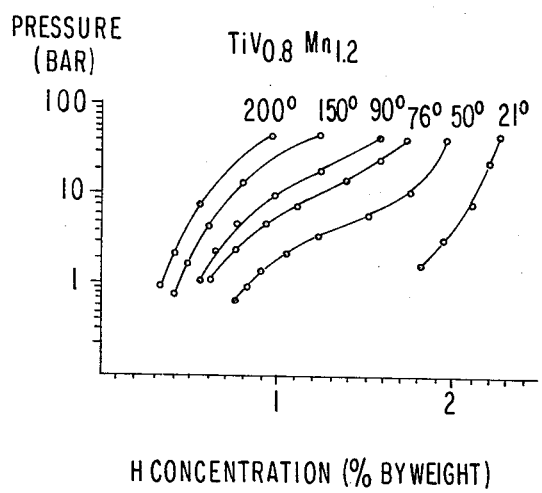
Figure 4:
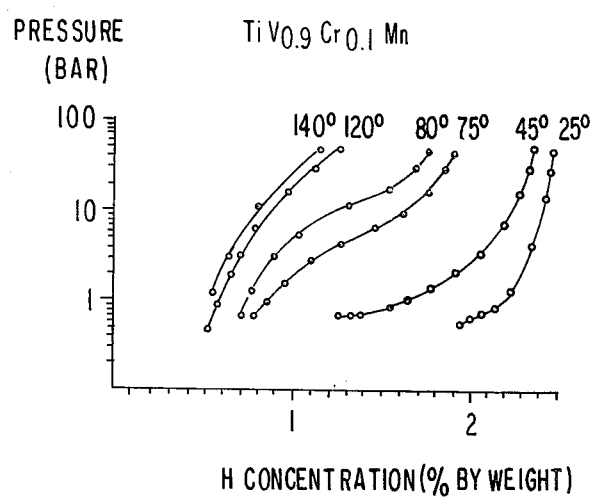

| Example | Composition in % by weight of the noted element (%) | Storage capacity in % by weight of $H_2$, relative to storage material (%) | Discharge capacity of the store up to 100° C., in percent of the storage capacity (%) | Notes |
| --- | --- | --- | --- | --- |
| 1 | 30.6% Ti<br>20.2% V<br>49.2% Mn<br>(Ti $V_{0.62}Mn_{1.4}$) | 2.2 | 90.9 | FIG. 2 |
| 2 | 30.5% Ti<br>19.5% V<br>5.3% Fe<br>44.7% Mn<br>(Ti $V_{0.6}Fe_{0.15}Mn_{1.28}$) | 2.15 | 93.0 | FIG. 1 |
| 3 | 28.7% Ti<br>13.7% V<br>3.3% Fe<br>54.2% Mn<br>(Ti $V_{0.45}Fe_{0.1}Mn_{1.65}$) | 2.2 | 97.7 | |
| 4 | 31.0% Ti<br>26.4% V<br>42.6% Mn<br>(Ti $V_{0.8}Mn_{1.2}$) | 2.3 | 70 | FIG. 3 for comparison |
| 5 | 31.1% Ti<br>29.8% V<br>3.4% Cr<br>35.7% Mn<br>(Ti $V_{0.9}Cr_{0.1}Mn$) | 2.45 | 70 | FIG. 4 for comparison |

While we have shown and described several embodiments in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A hydrogen storage material comprising an alloy of the composition of 25 to 30.9% by weight of titanium, 10 to 42% by weight of vanadium and 27.1 to 65.1% by weight of manganese, where more than 2 up to at most 2.2 other atoms—in the alloy—are present per titanium atom.

2. The hydrogen storage material according to claim 1, wherein up to about 40% of the vanadium atoms are replaced by iron atoms and up to 10% of the vanadium atoms are replaced by aluminum atoms, but not more than 40% of the vanadium atoms in total are replaced by iron and aluminum atoms.

3. The hydrogen storage material of claim 2, wherein about 10% to about 40% of the vanadium atoms are replaced by iron atoms.

4. The hydrogen storage material of claim 2, wherein about 3% to about 10% of the vanadium atoms are replaced by aluminum atoms.

5. The hydrogen storage material according to claim 1, wherein a mixture is used in which up to about 20% of the titanium fraction are replaced by Ca, Y, La, misch metal, or mixtures thereof.

6. The hydrogen storage material according to claim 1, wherein up to 0.2 atom of Cr per titanium atom is present in the alloy, the Cr atoms replacing a corresponding number of manganese and/or vanadium atoms.

7. The hydrogen storage material according to claim 1, wherein up to about 0.1 atom of Ni per titanium atom is present in the alloy.

8. The hydrogen storage material of claim 1, wherein up to about 0.05 atom of copper per titanium atom is present in the alloy.

9. The hydrogen storage material of claim 1, wherein not more than about 0.1 atom of nickel and copper per titanium atom is present in total, the nickel and copper atoms replacing a corresponding number of manganese or vanadium atoms.

* * * * *